US009153154B2

(12) United States Patent
Hsu

(10) Patent No.: US 9,153,154 B2
(45) Date of Patent: Oct. 6, 2015

(54) DISPLAY PANEL AND TESTING METHOD THEREOF

(71) Applicant: Chunghwa Picture Tubes, LTD., Taoyuan (TW)

(72) Inventor: Han-Tung Hsu, Taoyuan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 25 days.

(21) Appl. No.: 14/106,851

(22) Filed: Dec. 16, 2013

(65) Prior Publication Data

US 2015/0123882 A1 May 7, 2015

(30) Foreign Application Priority Data

Nov. 1, 2013 (TW) ............................ 102139755 A

(51) Int. Cl.
*G06F 3/038* (2013.01)
*G09G 3/00* (2006.01)

(52) U.S. Cl.
CPC ............ *G09G 3/006* (2013.01); *G09G 2300/08* (2013.01)

(58) Field of Classification Search
CPC .......... G09G 3/006; G09G 2300/0426; G09G 3/3648; G09G 2330/12; G09G 3/3611; G09G 3/3655; G09G 2320/029; G09G 2320/0693; G09G 2330/04; G09G 2320/0233; G09G 3/2003; G09G 3/3466; G09G 2300/0842; G09G 3/3688; G09G 2300/0408; G09G 2300/0465; G09G 2310/0275; G09G 2320/0295; G09G 2320/043; G06F 3/0412; G06F 3/041; G06F 3/0414; G06F 3/0416; G06F 3/044; G02F 2001/136254; G02F 1/1309; G02F 1/136286; G02F 1/136259; G02F 1/1345; G02F 1/13454; G02F 1/1339; G02F 1/134336; G02F 1/1368; G02F 2001/134345; G02F 1/133351; G02F 1/13458; G02F 2001/136
USPC ........................ 345/87, 88, 89, 205, 206, 904
See application file for complete search history.

(56) References Cited

U.S. PATENT DOCUMENTS 7,288,955 B2 * 10/2007 Jeon ......................... 324/760.02
2007/0012969 A1 1/2007 Mouli
2013/0307557 A1 * 11/2013 Lee et al. ...................... 324/522

FOREIGN PATENT DOCUMENTS

TW 541702 7/2003
TW 200641439 12/2006
TW 201205531 2/2012

OTHER PUBLICATIONS

"Office Action of Taiwan Counterpart Application", issued on Dec. 17, 2014, p. 1-p. 8.

*Primary Examiner* — Duc Dinh
(74) *Attorney, Agent, or Firm* — Jianq Chyun IP Office

(57) ABSTRACT

A display panel and a testing method are provided. The display panel has a display region and a peripheral circuit region, and includes an active device array substrate, an opposite substrate and a display medium located between the above two substrates. The active device array substrate includes scan lines, data lines, pixel units, a common electrode layer and testing lines. The scan lines and the data lines are intersected to define a plurality of pixel regions in the display region. The pixel units are disposed in the display region respectively, and each pixel unit is electrically connected to the corresponding scan line and the data line. The common electrode layer covers the data lines at least. The testing lines are disposed in the display region, and each testing line which is located between the common electrode layer and the data lines is at least overlapped to the data lines.

9 Claims, 4 Drawing Sheets

DISPLAY PANEL AND TESTING METHOD THEREOF

CROSS-REFERENCE TO RELATED APPLICATION

This application claims the priority benefit of Taiwan application serial no. 102139755, filed on Nov. 1, 2013. The entirety of the above-mentioned patent application is hereby incorporated by reference herein and made a part of this specification.

BACKGROUND

1. Technical Field

The invention relates to a panel and a testing method thereof.

2. Related Art

Generally, a display panel is composed of an active device array substrate, an opposite substrate and a display medium layer disposed between the above two substrate.

An electrical testing is generally performed after the manufacturing process of the active device array substrate is completed, so as to ensure that the active device array substrate does not have a defect that influences a display quality during the manufacturing process. Moreover, in case that the defect that influences the display quality is detected, a position of the defect can be further found for repairing, so as to improve a manufacturing yield.

However, when a data line and a common electrode in the active device array substrate are short-circuited, since the common electrodes are electrically connected in an array and distributed on the data lines, the position of the defect cannot be determined for repairing according to a testing result, which increases a cost caused by the deteriorated manufacturing process. Therefore, how to correctly determine the position of the defect in case that the data line and the common electrode are short-circuited is an important problem required to be resolved.

SUMMARY

The invention is directed to a display panel and a testing method thereof, when a data line is short-circuited to a common electrode layer, coordinates of a scan line corresponding to a short-circuit position is detected.

The invention provides a display panel having a display region and a peripheral circuit region, and including an active device array substrate, an opposite substrate and a display medium layer disposed between the active device array substrate and the opposite substrate. The active device array substrate includes a plurality of scan lines, a plurality of data lines, a plurality of pixel units, a common electrode layer and a plurality of testing lines. The scan lines and the data lines are intersected to define a plurality of pixel regions in the display region. The pixel units are respectively disposed in the pixel regions, and each of the pixel units is electrically connected to the corresponding scan line and the data line. The common electrode layer at least covers the data lines. The testing lines are disposed in the display region, and each of the testing lines is at least overlapped with the data lines, and is located between the common electrode layer and the data lines.

The invention provides a testing method of a display panel. In the method, the aforementioned display panel is provided. A testing signal is input to one of the testing lines. A testing result signal is received from the data line corresponding to one of the testing lines, where when the testing result signal is enabled, it is determined that the data line corresponding to one of the testing lines is electrically connected to the common electrode layer and the testing line located between the data lines and the common electrode layer, so as to obtain a position where the data line corresponding to one of the testing lines is short-circuited to the common electrode layer.

According to the above descriptions, since the testing lines are disposed between the common electrode layer and the data lines, when the data line is short-circuited to the common electrode layer, the testing signal is input to one of the testing lines, and the testing result signal is received from the data line corresponding to the testing line, where when the testing result signal is enabled, it is determined that the data line corresponding to the testing line is electrically connected to the common electrode layer and the testing line located between the data lines and the common electrode layer, so as to obtain a position where the data line corresponding to the testing line is short-circuited to the common electrode layer, and accordingly determine coordinates of the scan line corresponding to the position where the short-circuit is occurred.

In order to make the aforementioned and other features and advantages of the invention comprehensible, several exemplary embodiments accompanied with figures are described in detail below.

DETAILED DESCRIPTION OF DISCLOSED EMBODIMENTS

Figure 1:
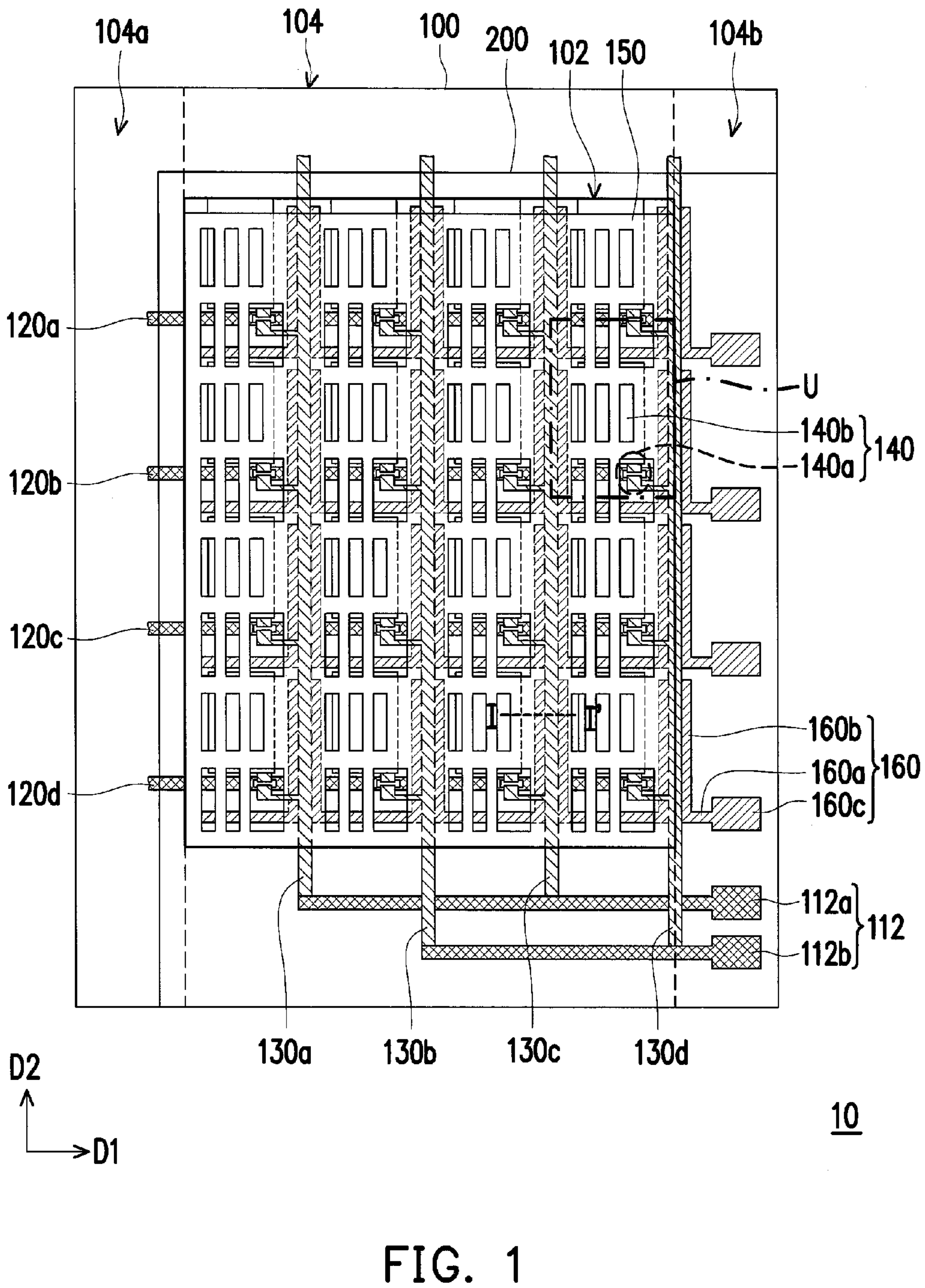
FIG. 1 is a top view of a display panel according to an embodiment of the invention.
Figure 2:
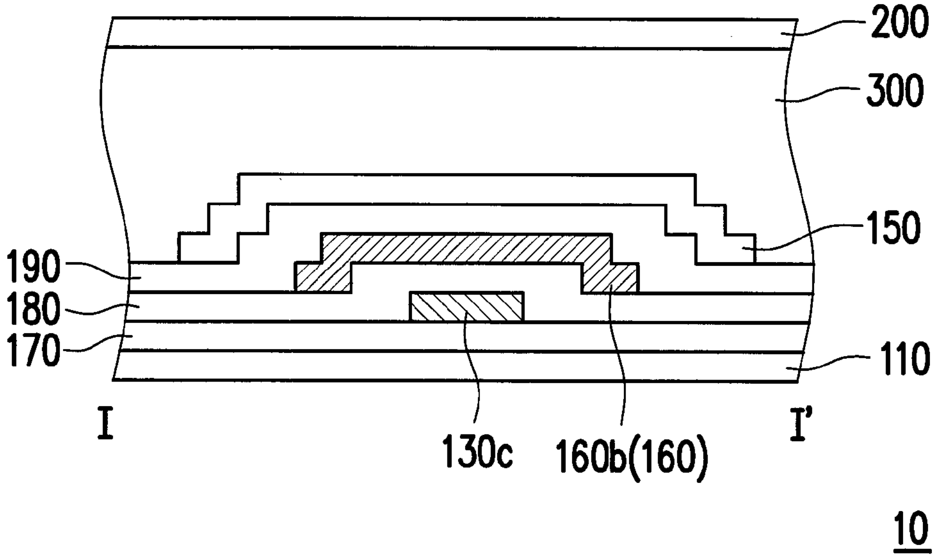
FIG. 2 is a cross-sectional view of FIG. 1 along a section line I-I'.

FIG. 1 is a top view of a display panel according to an embodiment of the invention. FIG. 2 is a cross-sectional view of FIG. 1 along a section line I-I'. Referring to FIG. 1 and FIG. 2, in the present embodiment, the display panel 10 has a display region 102 and a peripheral circuit region 104, and includes an active device array substrate 100, an opposite substrate 200 and a display medium layer 300 disposed between the active device array substrate 100 and the opposite substrate 200.

The active device array substrate 100 includes a substrate 110, a plurality of scan lines 120*a*-120*d*, a plurality of data lines 130*a*-130*d*, a plurality of pixel units 140, a common electrode layer 150 and a plurality of testing lines 160.

In detail, in the display region 102 of the active device array substrate 100, the scan lines 120*a*-120*d* are parallel to each other and extend along a first direction D1, and the data lines 130*a*-130*d* are parallel to each other and extend along a second direction D2, where the first direction D1 is different to the second direction D2, and the scan lines 120*a*-120*d* and the data lines 130*a*-130*d* are intersected to define the display region 102 into a plurality of pixel regions U. The pixel units 140 are respectively configured in the pixel regions U. The pixel unit 140 is at least electrically connected to one of the scan lines 120*a*-120*d* and one of the data lines 130*a*-130*d*. In detail, the pixel unit 140 may include an active device 140*a* and a pixel electrode 140*b* electrically connected to the active device 140*a*, where the active device 140*a* is electrically connected to the corresponding scan line and the corresponding data line. The above structure of the pixel unit 140 is only an explanatory example, and the numbers and shapes of the active device 140*a* and the pixel electrode 140*b* in the pixel unit 140 are not limited by the invention, and the numbers of the scan lines and the data lines electrically connected to the pixel unit 140 are not limited by the invention either as well.

The common electrode layer 150 is disposed in all of the pixel regions U and is patterned. The common electrode layer 150 in each of the pixel region U may have a plurality of openings to expose the active device 140*a* and a part of the pixel electrode 140*b*. Since the common electrode layers 150 in adjacent pixel regions U are connected to each other, at least a part of the common electrode layer 150, a part of the data lines 130*a*-130*d* and a part of the scan lines 120*a*-120*d* are overlapped. In the present embodiment, the common electrode layer 150 and the pixel electrodes 140*b* are all disposed on the same substrate 110, and the display panel 10 is, for example, a fringe field switching (FFS) display panel.

The testing lines 160 are at least overlapped with the data lines 130*a*-130*d*, and are located between the common electrode layer 150 and the data lines 130*a*-130*d*.

In detail, the testing line 160 includes a connecting portion 160*a* and a plurality of finger portions 160*b* connected to the connecting portion 160*a*, as that shown in FIG. 1. The connecting portions 160*a* o f the testing lines 160 are arranged in parallel and extend along the first direction D1. The connecting portions 160*a* are arranged along the second direction D2 to substantially distribute over the entire display region 102, and are arranged in parallel to the scan lines 120*a*-120*d*.

At a junction of projections of the connecting portion 160*a* and each of the data lines 130*a*-130*d* that are projected to a same plane, the testing line 160 further extends from the connecting portion 160*a* towards the adjacent connecting portion 160*a* along the second direction D2 to form the finger portions 160*b*. Each of the finger portions 160*b* is at least partially overlapped to a portion of one of the data lines 130*a*-130*d*. In other words, the finger portion 160*b* of the testing line 160 is located between the data line 130*c* and the common electrode layer 150, such that at least a part of the common electrode layer 150 is overlapped with the data lines 130*a*-130*d*.

In the present embodiment, the finger portion 160*b* is connected to one of the connecting portions 160*a*. The finger portion 160*b* extends towards and is not connected to a next connecting portion 160*a*, such that a length of each of the finger portions 160*b* is substantially a length of one pixel unit 140. According to another point of view, the finger portions 160*b* of a same testing line and the pixel units of one row are ranged alternately, and the connecting portion 160*a* connected to the finger portions 160*b* are disposed adjacent to one of the scan lines 120*a*-120*d* electrically connected to the pixel units 140 of the said row . Therefore, coordinates of each testing line 160 correspond to coordinates of one of the scan lines 120*a*-120*b*.

In detail, FIG. 2 a cross-sectional view of FIG. 1 along the section line I-I'. Referring to FIG. 2, a gate insulation layer 170, the data line 130*c*, a first insulation layer 180, the finger portion 160*b* of the testing line 160, a second insulation layer 190 and the common electrode layer 150 are sequentially disposed on the substrate 110. The finger portion 160*b* of the testing line 160 is located between the data line 130*c* and the common electrode layer 150, and the first insulation layer 180 is disposed between the finger portion 160*b* and the data line 130*c*, and the second insulation layer 190 is disposed between the finger portion 160*b* and the common electrode layer 150. Therefore, in general, the finger portion 160*b*, the data line 130*c* and the common electrode layer 150 are in an electrically independent state.

In the present embodiment, the peripheral circuit region 104 on the active device array substrate 100 can be divided into a driving device setting region 104*a* and a testing device setting region 104*b*. The driving device setting region 104*a* and the testing device setting region 104*b* are respectively located at two opposite sides of the display region 102, though the invention is not limited thereto, and the driving device setting region 104*a* and the testing device setting region 104*b* can also be located at a same side of the display region 102. To facilitate the description, the situation that the driving device setting region 104*a* and the testing device setting region 104*b* are respectively located at two opposite sides of the display region 102 is taken as an example for description.

As that shown in. FIG. 1, a plurality of testing pads 160*c* are disposed in the testing device setting region 104*b*. Each of the testing pads 160*c* is electrically connected to a corresponding connecting portion 160*a*. Here, since each of the testing pads 160*c* has the same function, the testing pads 160*c* are represented by a same symbol 160*c*. In case of a non-detection mode, the testing line 160 is in an electrical floating state, and is not connected to the other signal input devices, though the invention is not limited thereto, and the testing line 160 can also be designed to have a fixed signal under the non-detection mode. To facilitate the description, the situation that the testing line 160 is in the electrical floating state is taken as an example for descriptions.

The peripheral circuit region 104 on the active device array substrate 100 is further configured with a plurality of signal pads 112. The signal pads 112 include a first signal pad 112*a* serially connecting the odd data lines 130*a* and 130*c* and a second signal pads 112*b* serially connecting the even data lines 130*b* and 130*d*, though the serial connecting method and the number of the signal pads are not limited thereto. As that shown in FIG. 1, the signal pads 112 and the data lines 130*a*-130*d* can be different film layers to meet a demand for jumper. Moreover, the signal pads 112 are electrically connected to the corresponding data lines 130*a*-130*d* respectively.

After a manufacturing process of the active device array substrate 100 is completed, an electrical testing procedure is generally performed, and a detecting method thereof is described below with reference of the active device array substrate 100 of FIG. 1. Referring to FIG. 1 and FIG. 2, a testing signal can be respectively input to each of the testing pads 160*c*, and it is detected whether there is a signal output through each of the signal pads 112, though the method for transmitting the testing signal is not limited thereto. The testing signal can also be respectively input to each of the signal pads 112, and it is detected whether there is a signal output through each of the testing pads 160*c*. To facilitate description, a situation that the testing signal is input to each of the testing pads 160*c* and the signal is received through the signal pads 112 is taken as an example for descriptions.

Figure 3:
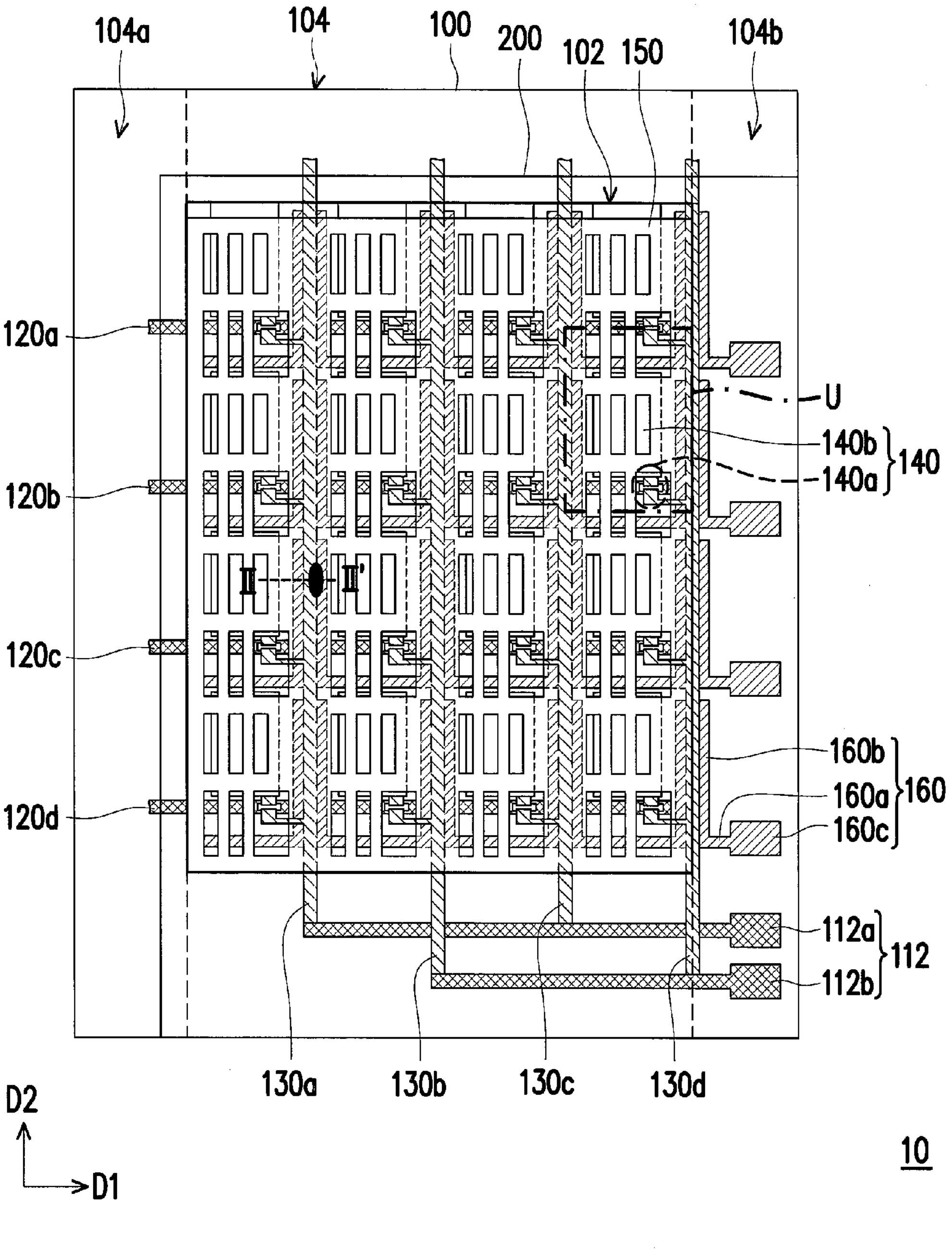
FIG. 3 is a top view of a display panel in which a data line is short-circuited to a common electrode layer according to an embodiment of the invention.
Figure 4:
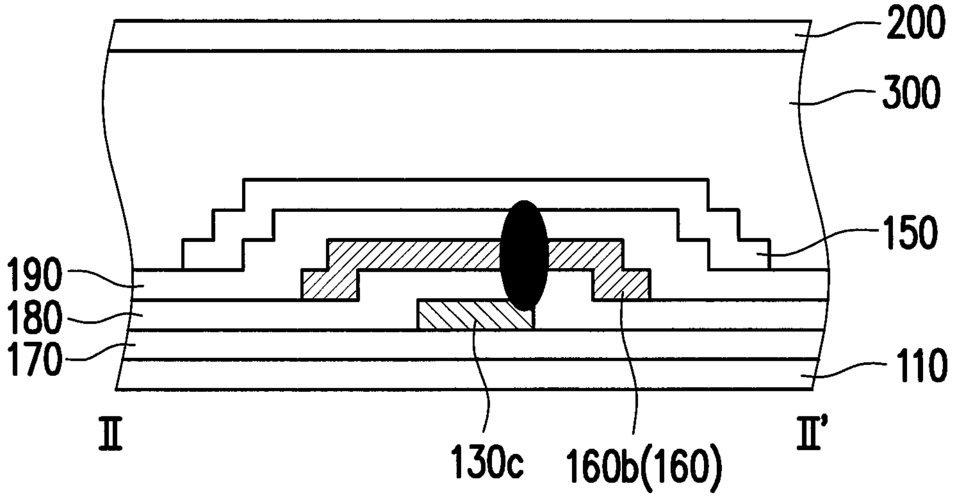
FIG. 4 is a cross-sectional view of FIG. 3 along a section line II-II' where the data line is short-circuited to the common electrode layer.

For example, FIG. 3 is a top view of the display panel in which a data line is short-circuited to the common electrode layer according to an embodiment of the invention. FIG. 4 is a cross-sectional view of FIG. 3 along a section line II-II'. Referring to FIG. 3 and FIG. 4, the data line 130*a* is short-circuited to the common electrode layer 150, and a short-circuit position thereof is near the section line II-II' as that shown in FIG. 3. The data line 130*a* is short-circuited to the common electrode layer 150, i.e. the insulation layers 180 and 190 disposed between the data line 130*a* and the common electrode layer 150 are damaged, such that the data line 130*a* and the common electrode layer 150 are electrically connected. Moreover, the finger portion 160*b* of the testing line 160 configured between the data line 130*a* and the common electrode layer 150 is also electrically connected to the data line 130*a* and the common electrode layer 150.

The testing signal is sequentially input to the testing pads 160*c*, and detection signals are simultaneously received from the signal pads 112. For example, when the testing signal is input to a first testing line 160 (corresponding to the scan line 120*a*), a testing result signal is received from the data line 130*a*, and now the testing result signal is not enabled (for example, a current signal is not received from the corresponding first signal pad 112*a*), and it is determined that none short-circuit is occurred to the part of the data lines 130*a*-130*d* corresponding to the pixel units 140 connected to the scan line 120*a*.

When the testing signal is input to a third testing line 160 (corresponding to the scan line 120*c*), the testing result signal is received from the data line 130*a*, and now the testing result signal is enabled (for example, a current signal is received from the corresponding first signal pad 112*a*), and it is determined that the finger portion 160*b* of the third testing line 160 is electrically connected to the data line 130*a* and the common electrode layer 150, such that coordinates of the testing line 160 at the short-circuit position is obtained, so as to obtain coordinates of the corresponding scan line 120*c*. In other words, it is determined that the short-circuit is occurred to the part of the data lines 130*a*-130*d* corresponding to the pixel units 140 connected to the scan line 120*c*.

Then, a visual detection is performed through a design or a cell shorting bar (CST) to obtain the coordinates of the data line 130*a* where short-circuit is occurred. Therefore, according to the above detection method, the coordinates of the scan line 120*c* and the data line 130*a* where short-circuit is occurred can be accurately determined.

In summary, in the pixel units corresponding to each of the scan lines on the active device array substrate of the display panel, finger portions of a testing line are disposed between the data line and the common electrode layer, and are connected in series to each other through the connection portion of the testing line along a direction parallel to the scan line. Each of the testing lines is electrically connected to a testing pad in the non-display region, and each of the data lines is also connected in series to the signal pad in the non-display region. In this way, when the electrical testing is to be performed after the manufacturing process of the active device array substrate is completed, a testing signal can be respectively input to each of the testing pads, and it is detected whether a signal is received from the signal pad. In this way, in case that the data line and the common electrode layer in the active device array substrate are short-circuited, the coordinates of the scan line having the short-circuit problem can be accurately determined, so as to facilitate repairing the short-circuit and improving a production yield.

What is claimed is:

1. A display panel, having a display region and a peripheral circuit region, the display panel comprising:
- an active device array substrate, comprising:
  - a plurality of scan lines and a plurality of data lines, intersected to define a plurality of pixel regions in the display region;
  - a plurality of pixel units, respectively disposed in the pixel regions, wherein each of the pixel units is electrically connected to the corresponding scan line and the data line;
  - a common electrode layer, at least covering the data lines; and
  - a plurality of testing lines, disposed in the display region, wherein each of the testing lines is at least overlapped with the data lines, and is located between the common electrode layer and the data lines, each of the testing lines comprises a connecting portion and a plurality of finger portions connected to the connecting portion, and each of the finger portions is overlapped to one of the data lines;
- an opposite substrate, disposed opposite to the active device array substrate; and
- a display medium layer, disposed between the active device array substrate and the opposite substrate.

2. The display panel as claimed in claim 1, wherein an extending direction of the connecting portion is parallel to an extending direction of the scan line.

3. The display panel as claimed in claim 1, wherein a length of each of the finger portions is a length of one pixel unit.

4. The display panel as claimed in claim 1, wherein the testing lines are electrically floating.

5. The display panel as claimed in claim 1, wherein a first insulation layer is disposed between the testing lines and the common electrode layer, and a second insulating layer is disposed between the testing lines and the data lines.

6. The display panel as claimed in claim 1, wherein the peripheral circuit region comprises a driving device setting region and a testing device setting region disposed at different sides of the display region, and the display panel further comprises a plurality of testing pads disposed in the testing device setting region, and each of the testing lines extends from the display region to the testing device setting region to electrically connect one of the testing pads.

7. The display panel as claimed in claim 1, further comprising a plurality of signal pads disposed in the peripheral circuit region, wherein the data lines are electrically connected to one of the signal pads, respectively.

8. A testing method of a display panel, comprising:
- providing a display panel having a display region and a peripheral circuit region, wherein the display panel comprises:
- an active device array substrate, comprising:
  - a plurality of scan lines and a plurality of data lines, intersected to define a plurality of pixel regions in the display region;
  - a plurality of pixel units, respectively disposed in the pixel regions, wherein each of the pixel units is electrically connected to the corresponding scan line and the data line;
  - a common electrode layer, at least covering the data lines; and
  - a plurality of testing lines, disposed in the display region, wherein each of the testing lines is at least overlapped to the data lines, and is located between the common electrode layer and the data lines;
- an opposite substrate, disposed opposite to the active device array substrate; and
- a display medium layer, disposed between the active device array substrate and the opposite substrate;
- inputting a testing signal to one of the testing lines;
- receiving a testing result signal from the data line corresponding to one of the testing lines, wherein when the testing result signal is enabled, it is determined that the data line corresponding to one of the testing lines is electrically connected to the common electrode layer and the testing line located between the data lines and the common electrode layer, to obtain a position where the data line corresponding to one of the testing lines is short-circuited to the common electrode layer.

9. The testing method of the display panel as claimed in claim 8, wherein each of the testing lines comprises a connecting portion and a plurality of finger portions connected to the connecting portion, and each of the finger portions is overlapped to one of the data lines, and an extending direction of the connecting portion is parallel to an extending direction of the scan line, and the testing method of the display panel further comprises:

inputting the testing signal to the connecting portion of one of the testing lines; and receiving the testing result signal from the data line corresponding to one of the testing lines, wherein when the testing result signal is enabled, it is determined that the data line corresponding to one of the testing lines is electrically connected to the common electrode layer and the testing line located between the data lines and the common electrode layer, so as to obtain a position where the data line corresponding to one of the testing lines is short-circuited to the common electrode layer.

* * * * *